UNITED STATES PATENT OFFICE.

ALBERT SIEVERS, OF SAN FRANCISCO, CALIFORNIA.

IMPROVEMENT IN CATTLE-WASHES.

Specification forming part of Letters Patent No. 171,875, dated January 4, 1876; application filed August 11, 1875.

*To all whom it may concern:*

Be it known that I, ALBERT SIEVERS, of San Francisco city and county, State of California, have invented an Improved Cattle-Wash; and I do hereby declare the following description is sufficient to enable any person skilled in the art or science to which it most nearly appertains to make and use my said invention without further invention or experiment.

My invention relates to an improved wash or cleansing-fluid for cleaning horses, cattle, and sheep, and for destroying insects which breed upon cattle and sheep.

To make my improved cattle-wash I use white vitriol, one-third; extract of hellebore, two-thirds.

These ingredients I mix together in the proportions named and then add from one-half gallon to three gallons of water to every pound of the mixture, according to the strength of wash desired.

For a sheep-wash the mixture should be quite strong, and when it is to be used for this purpose the minimum quantity of water should be used, but when it is to be used upon horses and cattle it should be further diluted according to the necessities in each case.

After combining the water with this mixture I boil it for about thirty minutes, or until the whole is thoroughly cooked and mixed, thus producing a wash of the proper consistency, and one of great efficiency.

This wash will not injure wool or hair, and its only effect upon the skin of the animal is of a curative character.

Having thus described my invention, what I claim, and desire to secure by Letters Patent, is—

A sheep and cattle wash composed of white vitriol and the extract of hellebore and water, and prepared substantially as above described.

ALBERT SIEVERS.

Witnesses:
JNO. L. BOONE,
C. M. RICHARDSON.